C. L. KUBISTA AND J. J. KOVAR.
TRANSMISSION MECHANISM.
APPLICATION FILED MAY 12, 1920.
1,418,809.
Patented June 6, 1922.
3 SHEETS—SHEET 1.
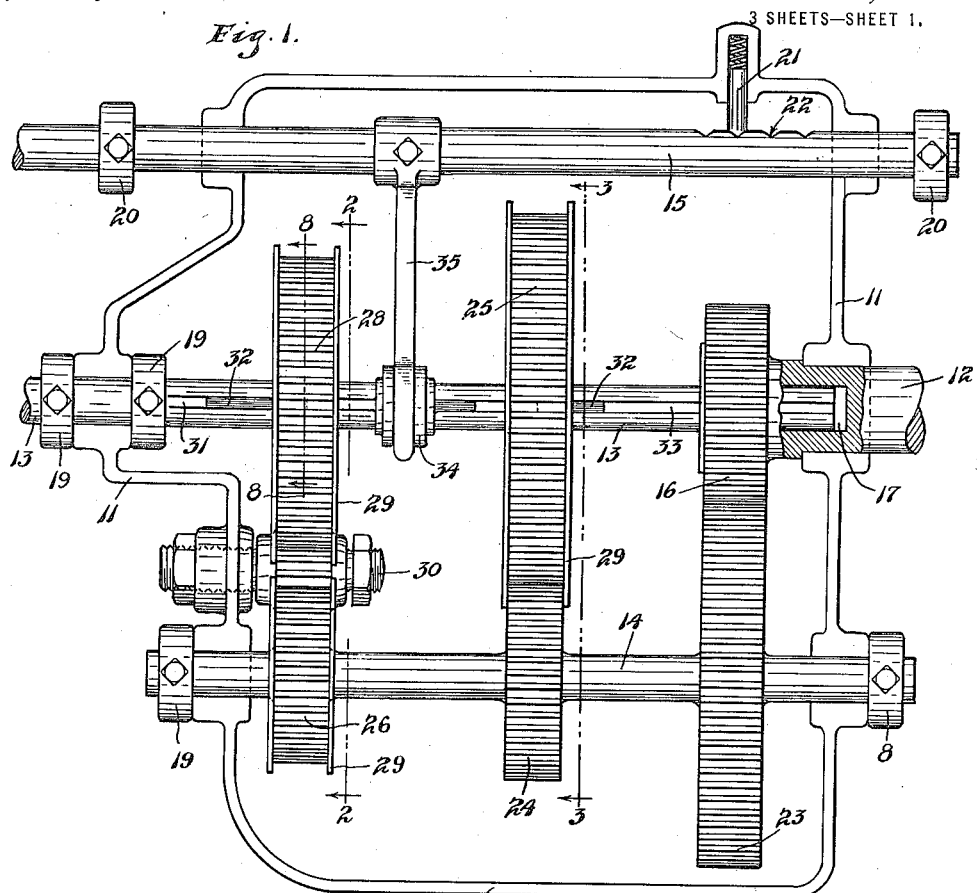
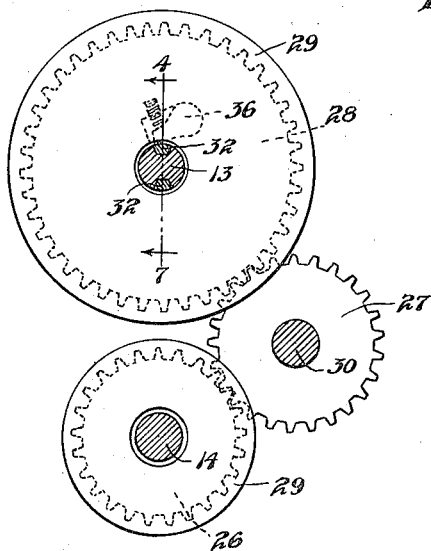
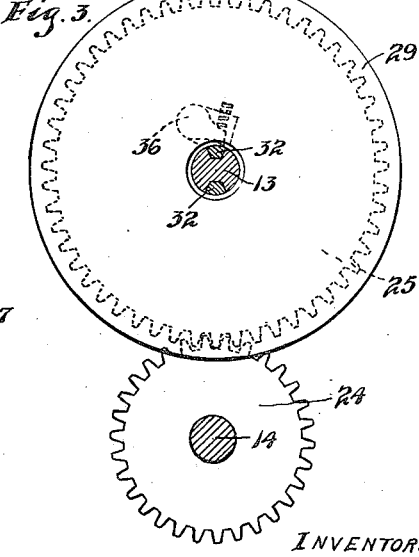
INVENTORS.
CHARLES L. KUBISTA
JOSEPH J. KOVAR.
BY THEIR ATTORNEYS.

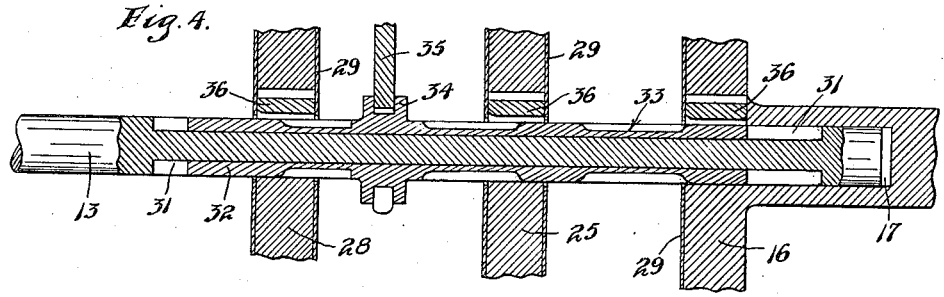
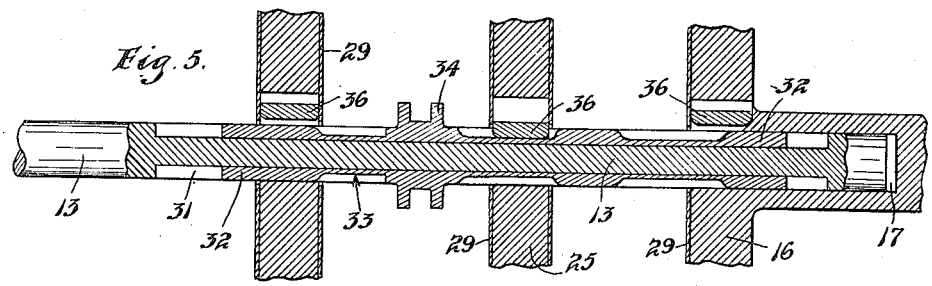
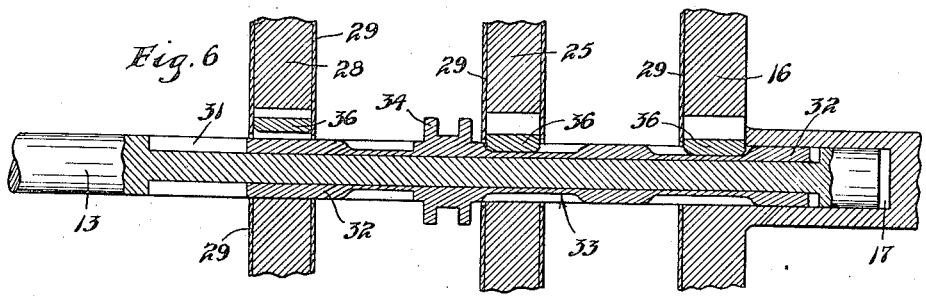
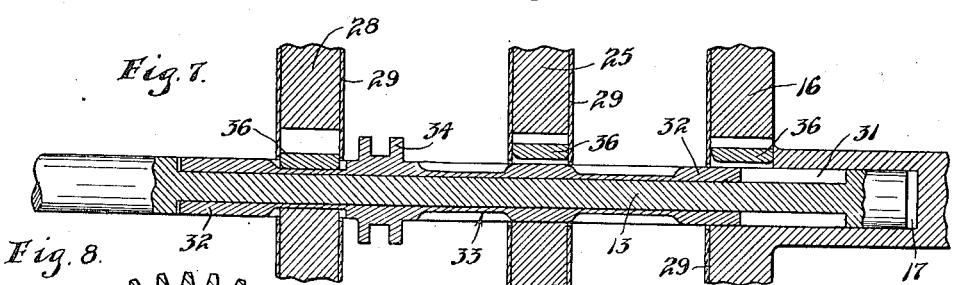
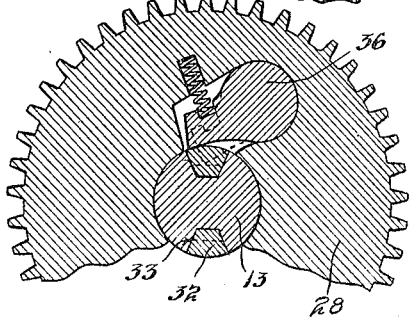
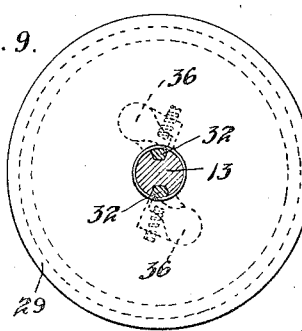

C. L. KUBISTA AND J. J. KOVAR.
TRANSMISSION MECHANISM.
APPLICATION FILED MAY 12, 1920.
1,418,809.
Patented June 6, 1922.
3 SHEETS—SHEET 3.
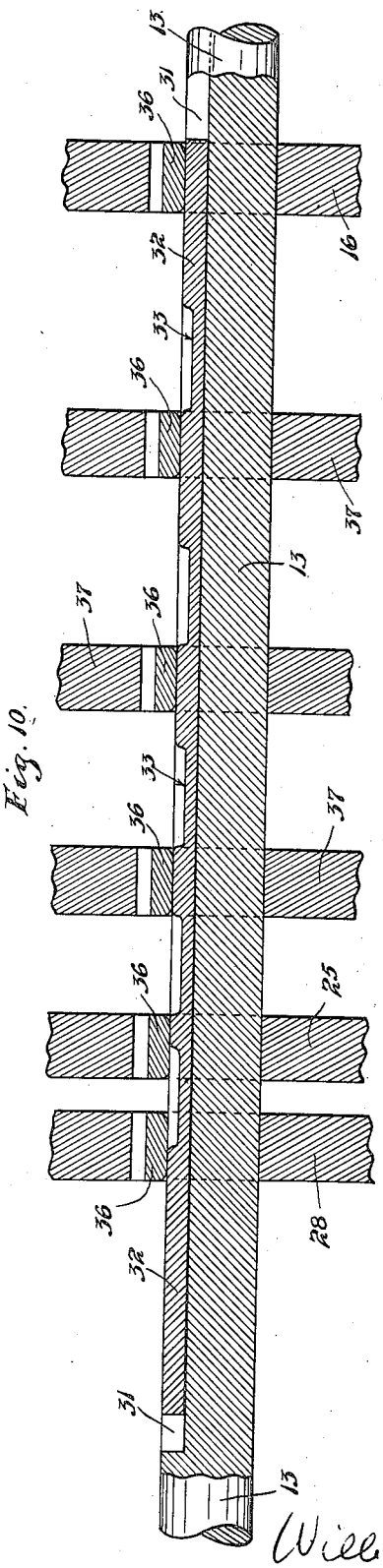
INVENTORS.
CHARLES L. KUBISTA
JOSEPH J. KOVAR
BY THEIR ATTORNEYS.

UNITED STATES PATENT OFFICE.

CHARLES L. KUBISTA, OF NEW ULM, MINNESOTA, AND JOSEPH J. KOVAR, OF OWATONNA, MINNESOTA; SAID KUBISTA ASSIGNOR TO SAID KOVAR.

TRANSMISSION MECHANISM.

1,418,809.   Specification of Letters Patent.   Patented June 6, 1922.

Application filed May 12, 1920. Serial No. 380,912.

*To all whom it may concern:*

Be it known that we, CHARLES L. KUBISTA and JOSEPH J. KOVAR, citizens of the United States, residing at New Ulm and Owatonna, in the counties of Brown and Steele, respectively, and State of Minnesota, have invented certain new and useful Improvements in Transmission Mechanisms; and we do hereby declare the following to be a full, clear, and exact description of the invention such as will enable others skilled in the art to which it appertains to make and use the same.

Our present invention relates to improvements in transmission mechanism, and has for its primary object to provide such a mechanism having a constant driving action while shifting from one speed to the other.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view showing a transmission mechanism embodying our invention, some parts being broken away and some parts being sectioned;

Fig. 2 is a transverse section taken on the line 2—2 of Fig. 1;

Fig. 3 is a transverse section taken on the line 3—3 of Fig. 1;

Figs. 4 to 7, inclusive, are views principally in longitudinal central section taken on the line 4—7 of Fig. 2;

Fig. 8 is a fragmentary view on an enlarged scale, taken on the line 8—8 of Fig. 1;

Fig. 9 is a view partly in side elevation and partly in transverse section, showing the use of two ratchet-acting dogs; and Fig. 10 is a view corresponding to Figs. 4 to 7, inclusive, but showing the use of additional gears.

Referring first to the invention as shown in Figs. 1 to 8, inclusive, the numeral 11 indicates a housing having bearings in which are journaled a driving shaft 12, a driven shaft 13, a counter-shaft 14 and a shipper rod 15. Rigid with the end of the driving shaft, within the housing 11, is a pinion 16, and which shaft and pinion have an axial bore 17 in which the adjacent end of the driven shaft 13 is rigidly journaled. Opposing collars 8 and 19, on the ends of the counter-shaft 14, hold the same against endwise movement, and opposing collars 19, on the driven shaft 13, engage one of the bearings for the driven shaft and hold the same against end-wise movement. Collars 20, on the shipper rod 15, limit the endwise movement thereof, and a spring-pressed bolt 21 is mounted in the housing 11 and arranged to enter longitudinally spaced lock notches 22 in said shipper rod and yieldingly hold the same in different set endwise adjustments.

Rigidly secured to the counter-shaft 14 is a high speed gear 23, which meshes with the pinion 16, a low speed pinion 24, which meshes with a low speed gear 25 loose on the driven shaft 13, and a reverse pinion 26, which meshes with an idle intermediate gear 27, which, in turn, meshes with a reverse gear 28 loose on said driven shaft. On the sides of the gear 25 are flanges 29 arranged to receive therebetween the pinion 24, to hold the said gear 25 against axial movement on the driven shaft 13. The pinion 26 and gear 28 are also provided on their sides with flanges 29, which receive therebetween the gear 27 to hold said pinion and gear aligned and also to hold the gear 28 against axial movement on the driven shaft 13. The gear 27 is loosely journaled on a stud 30 secured to the housing 11.

Formed in the driven shaft 13 are two diametrically opposite key-ways 31 having mounted therein keys 32, in which are formed longitudinally spaced notches 33 arranged in diametrically opposite pairs. These keys 32 are connected for simultaneous endwise movement by a shipper collar 34 arranged to receive a shipper fork 35 carried by the shipper rod 15. Mounted in the pinion 16 and in each gear 25 and 28, is a spring-pressed ratchet-acting dog 36 arranged to enter either one of the keyways 31 and drive the shaft 13 either forward or backward, as will presently appear.

When the keys are adjusted, as shown in Fig. 4, all of the dogs 36 are held released, and during the rotation of the shaft 12, the gears 25 and 28 will simply rotate on the driven shaft 13. By giving the keys 32 a step of movement to the right, one of the notches 33 may be brought into a position under the dog 36 of the gear 25 to permit the same to enter one of the key-ways 31, as shown in Fig. 5, and thereby connect the gear 25 to the shaft 13 and drive the same at low speed from the driving shaft 12 through the pinion 16, gear 23, countershaft 14, pinion 24 and gear 25. A further step of movement to the right of the keys 32 will bring another one of the notches 33 under the dog 36 of the pinion 16 and allow the same to drop into one of the key-ways 31, as shown in Fig. 6, and thereby connect the driving shaft 12 directly to the driven shaft 13 to drive the same at high speed. The increased speed of the driven shaft 13 will cause the dog 36 of the gear 25 to ride over the periphery, thereof.

A still further movement of the keys 32 to the right will cause the respective key 32 to cam the dog 36 of the gear 25 out of the respective key-way 31. It is important to note that the keys 32 completely fill the key-ways 31 and thereby prevent the spring-pressed dogs 36 from clicking when striking the key-ways 31 during the rotation of the driven shaft 13, in respect thereto.

To reverse the shaft 13, the keys 32 are moved from a position, as shown in Fig. 4, a step of movement to the left to bring one of the notches 33 into a position under the dog 36 of the reverse gear 29 and allow the same to enter one of the key-ways 31, as shown in Fig. 7.

In some instances, it might be desirable to use two diametrically opposite dogs 36 for connecting the gears to the shaft 13, as shown in Fig. 9.

As shown in Fig. 10, a plurality of intermediate gears 37 may be mounted on the driven shaft 13, whereby the speed from low to high may be very gradually increased or the speed from high to low may be gradually decreased.

From the above description, it is evident that the driven shaft 13, when turning, is always connected to the driving shaft 12 and a connected gear is not released from the shaft 13 until another gear has been connected thereto, either to increase the speed or decrease the same. The invention is especially adapted for use in connection with motor-driven vehicles hauling heavy loads, such as dragging plows, for the reason that no time during the shifting from one speed to the other is the power removed from the driven shaft 13.

What we claim is:

1. A transmission mechanism comprising a driving shaft and a driven shaft, a plurality of sets of intermeshing gears of different ratios for connecting said shafts, a member movable to connect one of said shafts to the gears thereon, with a progressive action in which the one gear is connected before the other is released, said gears being constructed and arranged to drop behind the speed of the shaft on which they are mounted.

2. A transmission mechanism comprising a driving shaft having a pinion secured for rotation therewith, a counter-shaft having a gear and a pinion secured for rotation therewith, said gear meshing with the pinion on the driving shaft, a driven shaft, a gear loose on the driven shaft and meshing with the pinion on the counter-shaft, one-way clutches independently connecting the pinion on the driving shaft and the gear on the driven shaft to said driven shaft, and means for holding all of the clutches released and movable with a progressive action in which the one clutch is permitted to set before the other is released.

3. A transmission mechanism comprising a driving shaft having a pinion secured for rotation therewith, a counter-shaft having a gear and two pinions secured for rotation therewith, said gear meshing with the pinion on the driving shaft, a driven shaft, two gears loose on the driven shaft, one of which meshes with one of the pinions on the counter-shaft, an intermediate reversing gear meshing with the other pinion on the counter-shaft and the other gear on the driven shaft, one-way clutches independently connecting the pinion on the driving shaft and the gears on the driven shaft to said driven shaft, and means for holding all of the clutches released and movable with a progressive action in which the one clutch is permitted to set before the other is released, with the exception of the clutch of the gear meshing with the reversing gear.

4. A transmission mechanism comprising a driving shaft having a pinion secured for rotation therewith, a counter-shaft having a gear and a pinion secured for rotation therewith, said gear meshing with the pinion on the driving shaft, a driven-shaft, a gear loose on the driven shaft and meshing with the pinion on the counter-shaft, a key-way in the driven shaft, ratchet-acting dogs carried by the pinion on the driving shaft and the gears on the driven shaft and under strain to enter the key-way and connect said pinion and gears to the driven shaft, a notched key in the key-way, and means for moving the key with a progressive action to hold all of the dogs out of the key-way or permit the one dog to enter the key-way before the other is lifted therefrom.

In testimony whereof we affix our signatures.

CHARLES L. KUBISTA.
JOSEPH J. KOVAR.

Witnesses:
L. B. KROOK,
C. EPPER.